United States Patent [19]
Benoliel et al.

[11] Patent Number: 6,067,496
[45] Date of Patent: May 23, 2000

[54] AUTOMATIC DRIVER SYSTEM, AND A METHOD OF GENERATING A SPEED REFERENCE IN SUCH A SYSTEM

[75] Inventors: Serge Benoliel, Paris; Stéphane Feray-Beaumont, St Arnoult en Yvelines; Babak Dehbonei, Epinay sur Seine, all of France

[73] Assignee: GEC Alsthom Transport SA, Paris, France

[21] Appl. No.: 08/503,500

[22] Filed: Jul. 18, 1995

[30] Foreign Application Priority Data

Jul. 21, 1994 [FR] France ................................... 94 09059

[51] Int. Cl.$^7$ ....................................................... B60T 8/32
[52] U.S. Cl. ................................ 701/93; 701/96; 701/98; 701/24; 701/27; 180/170
[58] Field of Search ....................... 364/426.05, 242.024, 364/423.098, 424.032, 424.027, 424.035, 426.01, 426.041, 431.07, 436; 395/900; 246/182 B, 187 B, 182 R, 5, 187 C, 182 C, 187 R, 63 C; 180/168, 170, 179

[56] References Cited

U.S. PATENT DOCUMENTS

| | | | |
|---|---|---|---|
| 3,655,962 | 4/1972 | Koch ................................... | 364/426.05 |
| 3,891,833 | 6/1975 | Rhoton et al. ...................... | 364/426.05 |
| 4,217,643 | 8/1980 | Anderson et al. .................. | 364/426.05 |
| 4,235,402 | 11/1980 | Matty et al. ........................ | 364/426.05 |
| 4,270,716 | 6/1981 | Anderson ............................ | 364/426.05 |
| 4,459,668 | 7/1984 | Inoue et al. ......................... | 364/426.05 |
| 4,617,627 | 10/1986 | Yasunobu et al. .................. | 364/426.05 |
| 5,696,682 | 12/1997 | Benoliel et al. ............................ | 701/70 |

FOREIGN PATENT DOCUMENTS

| | | |
|---|---|---|
| 0257662A3 | 3/1988 | European Pat. Off. . |
| 0539885A3 | 5/1993 | European Pat. Off. . |

OTHER PUBLICATIONS

Proceedings of the International Workshop on Artificial Intelligence for Industrial Applications, May 25, 1998, Hitachi City, Japan, pp. 485–489—Oshima et al, "Operation System Based on Predictive Fuzzy Control".

Proceedings of the IEEE TENCON '93, Oct. 19, 1993, Beijing, China, pp. 338–342, Jia et al, "Automatic Train Control—An Intelligent Approach".

*Patent Abstracts of Japan,* vol. 17, No. 472 (M–1470) Aug. 27, 1993 & JP–A–05 112 243 (Toshiba Corp) May 7, 1993.

*Patent Abstracts of Japan,* vol. 18, No. 352 (M–1631) Jul. 4, 1994 & JP–A–06 090 508 (Toshiba Corp) Mar. 29, 1994.

*Patent Abstracts of Japan,* vol. 17, No. 520 (M–1482) Sep. 20, 1993 & JP–A–05 137 216 (Toshiba Corp) Jun. 1, 1993.

*Elektrische Bahnen,* vol. 87, No. 5, May 1989, Munchen De; pp. 141–148; W. Biella, "Rechnergesteuerte Fahrkennlinienvorgaben fur energieoptimale Zugfahrten bei Gleichstrombahnen".

*Primary Examiner*—Jacques H. Louis-Jacques
*Attorney, Agent, or Firm*—Sughrue, Mion, Zinn, Macpeak & Seas, PLLC

[57] ABSTRACT

The present invention relates to an automatic driver system comprising:

means for recording a plurality of precalculated reference situations giving the time required to reach a target point as a function of the position of a vehicle on a track and of speed limits that apply to various lengths of the track; and at least one fuzzy inference system SIF.

The present invention also relates to a method of generating a speed reference in an automatic driver system, the method constituting in the present situation of a vehicle is evaluated relative to a plurality of precalculated reference situations giving the time required to reach a target point as a function of the position of a vehicle on a track in such a manner as to generate the travel time of the vehicle.

18 Claims, 4 Drawing Sheets

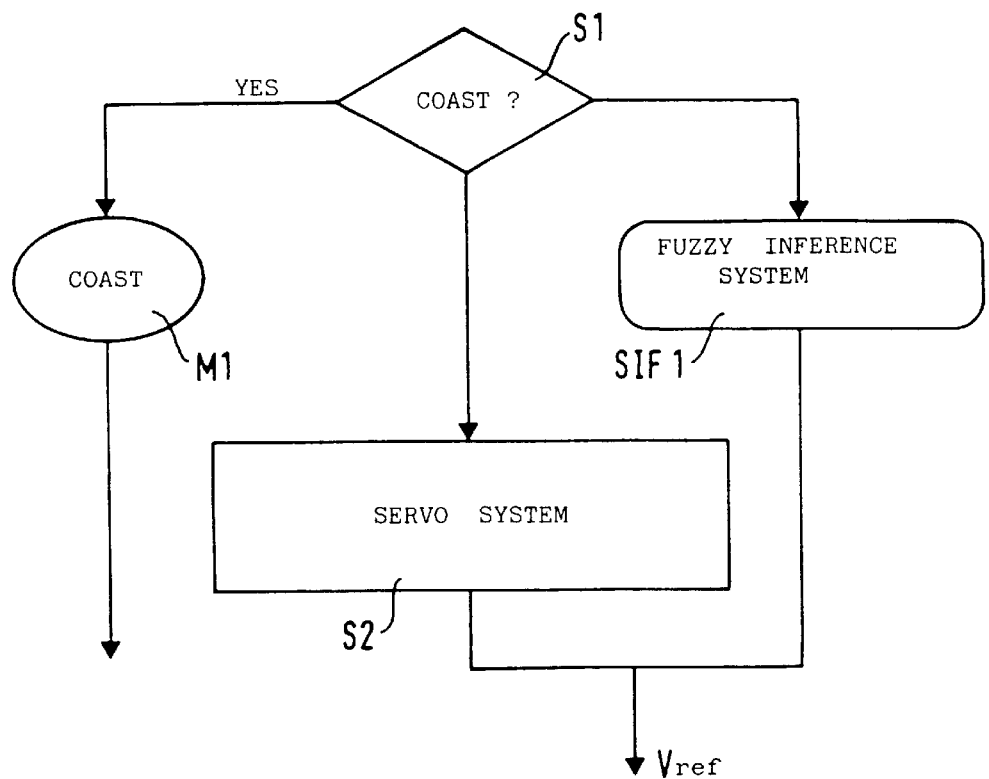
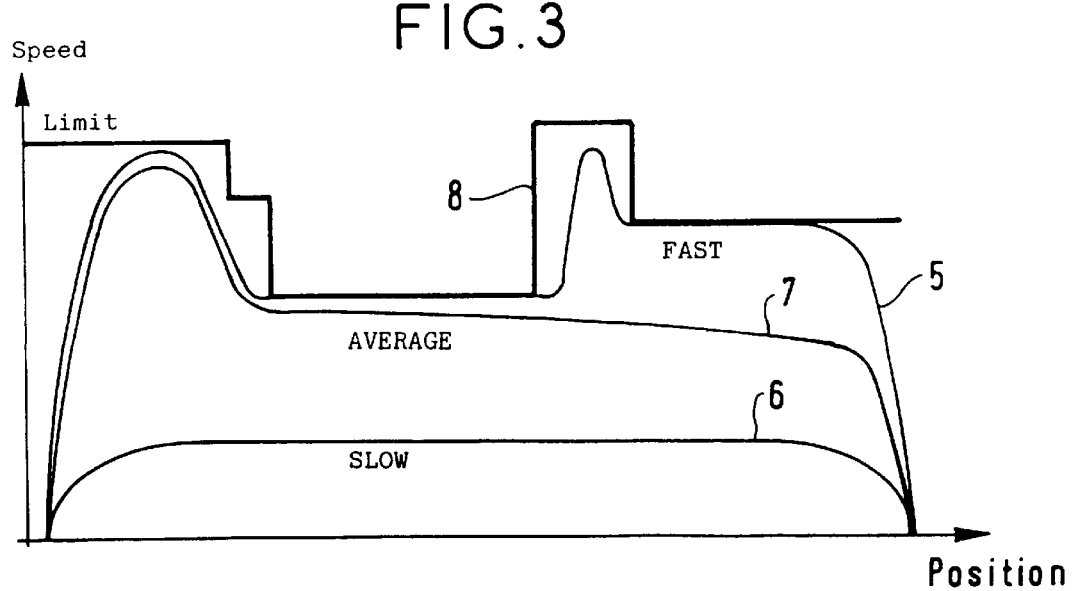

MEMBERSHIP LEVEL

AUTOMATIC DRIVER SYSTEM, AND A METHOD OF GENERATING A SPEED REFERENCE IN SUCH A SYSTEM

The present invention relates in general to systems and methods enabling travel time between a departure point and an arrival point to be managed, e.g. for a rail vehicle, and more particularly it relates to an automatic driver system and to a method of generating a speed reference in such a system.

BACKGROUND OF THE INVENTION

In a first category of prior art automatic driver systems, in particular for rail vehicles, the systems are linear type servo-control systems.

Such prior art automatic driver systems take account of certain external parameters and constraints such as: track profile, i.e. peaks and slopes; the possibility of allowing the vehicle to coast; passenger comfort, i.e. avoiding sudden changes between traction and braking; protecting other vehicles; and obeying the speed limit in each section.

However, such prior art automatic driver systems do not take account of certain other external parameters and constraints such as: the energy consumed by the vehicle; and guaranteed travel time.

In the state of the art, automatic driving in the Metro is performed in such a manner as to provide standard working. Standard working corresponds to a plurality of determined speed profiles between stations. A particular profile is selected by the network control system from a fixed number of options while the train is standing in a station. Each speed profile corresponds to a given travel time, but traffic disturbances can give rise to significant lateness. That method of generating a speed reference cannot catch up such lateness. In addition, energy consumption is optimized by coasting at predefined positions along the track.

The article "Design, realization, and improvement of an optimum fuzzy controller for a running train", by N. Geng and I. Muta, published in the Japanese Journal of Fuzzy Theory and Systems, Vol. 5, No. 1, 1993, pages 133 to 146, and the article "Total system for rapid transit and trends in control electronics for railway vehicles", by A. Oazama and M. Nomi, published in Hitachi Review, Vol. 35 (1986), No. 6, pages 297 to 304, illustrate prior art systems for automatic train driving.

OBJECTS AND SUMMARY OF THE INVENTION

Thus, an object of the invention is to provide an automatic driver system and a method of generating a speed reference that enable external parameters to be taken into account.

In other words, the invention seeks to provide an automatic driver system and a method of generating a speed reference that make it possible to minimize time differences relative to a reference travel time, to comply with a maximum speed profile, to comply with points that need to be protected, to comply with instructions to stop or slow down, and to adapt to small disturbances in traffic and catch up small amounts of lateness.

According to the invention, the automatic driver system comprises:

means for recording a plurality of precalculated reference situations giving the time required to reach a target point as a function of the position of a vehicle on a track and of speed limits that apply to various lengths of the track; and at least one fuzzy inference system SIF.

According to another characteristic of the invention, the automatic driver system comprises:

means for calculating a speed reference Sref;

means for generating an acceleration reference $\gamma$ref;

means for generating a traction command T; and means for causing the vehicle to coast.

According to another characteristic of the invention, the automatic driver system comprises:

describing the situation of a vehicle by means of a variable $\beta$, said variable $\beta$ characterizing the difference between the present situation and limit situations defined by:

a first precalculated reference situation corresponding to the minimum travel time and thus to the maximum possible speed over the journey; and a second precalculated reference situation corresponding to the maximum travel time and thus to the minimum speed over the journey.

The invention also provides an automatic driver system satisfying one of the following characteristics:

the variable $\beta$ is given by the following expression:

$$\beta = (Tmax - Trem)/(Tmax - Tmin)$$

where Tmax and Tmin are the remaining travel times corresponding respectively to maximum time operation and to minimum time operation; and where Trem is given by the expression:

$$Trem = Ttarget - Tpresent;$$

the reference speed to be followed is close to the maximum or to the minimum acceptable speed, when $\beta$ is respectively close to 1 or to 0; and a first precalculated reference situation corresponds to the minimum travel time and thus to a maximum possible speed over the journey;

a second precalculated reference situation corresponds to the maximum travel time and thus to a minimum speed over the journey;

a third precalculated reference situation corresponds to the mean travel time and thus to a mean speed over the journey; and speed limits imposed on different lengths of the track;

the recording means include at least one other precalculated reference situation.

According to a characteristic of the invention, the method of generating a speed reference in an automatic driver system comprises:

evaluating the present situation of a vehicle relative to a plurality of precalculated reference situations giving the time required to reach a target point as a function of the position of a vehicle on a track in such a manner as to generate the travel time of said vehicle.

According to another characteristic of the invention, the method of generating a speed reference in an automatic driver system comprises:

recording a plurality of precalculated reference situations giving the time required to reach a target point as a function of the position of a vehicle on a track; and calculating a speed reference Sref.

The method of this other characteristic of the invention may include the following additional steps which consist in:

generating an acceleration reference $\gamma$ref;

generating a traction command T; and causing the vehicle to coast.

According to another characteristic of the invention, the method of generating a speed reference in an automatic driver system comprises:

describing the situation of a vehicle by means of a variable β, said variable β characterizing the difference between the present situation and limit situations defined by:

a first precalculated reference situation corresponding to the minimum travel time and thus to a maximum possible speed over the journey; and a second precalculated reference situation corresponding to the maximum travel time and thus to a minimum speed over the journey.

The invention also provides a method of generating a speed reference in an automatic driver system that satisfies one of the following characteristics:

$$\beta=(Tmax-Trem)/(Tmax-Tmin)$$

where Tmax and Tmin represent the travel times that remain corresponding respectively to maximum time operation and to minimum time operation; and where Trem is given by the following expression:

$$Trem=Ttarget-Tpresent;$$

and the reference speed to be followed is close to the maximum or to the minimum acceptable speed, when β is respectively close to 1 or to 0.

An advantage of the automatic driver system of the invention and the method of generating a speed reference of the invention is to reduce the energy consumption of vehicles.

Another advantage of the automatic driver system of the invention and the method of generating a speed reference of the invention is to improve passenger comfort.

Another advantage of the automatic driver system of the invention and the method of generating a speed reference of the invention is its lack of sensitivity to changes in load and in vehicle characteristics.

Another advantage of the automatic driver system of the invention and the method of generating a speed reference of the invention is to comply with set travel times while taking advantage of coasting.

Time differences are generally less than five seconds and coasting percentage greater than thirty percent.

Another advantage of the automatic driver system of the invention and the method of generating a speed reference of the invention is to minimize lateness when the accumulated lateness following a stop is not compensable in full.

Another advantage of the automatic driver system of the invention and the method of generating a speed reference of the invention is that reductions in speed take place without oscillation.

BRIEF DESCRIPTION OF THE DRAWINGS

Other objects, characteristics, and advantages of the invention appear on reading the following description of the preferred embodiment of the automatic driver system and of the method of generating a speed reference in such a system, which description is given with reference to the accompanying drawings, in which:

FIG. 2 is an outline flow chart of a preferred embodiment of the system of the invention for calculating the reference speed Vref;

FIG. 3 shows three curves that correspond to three pre-calculated reference situations;

MORE DETAILED DESCRIPTION

Figure 1:
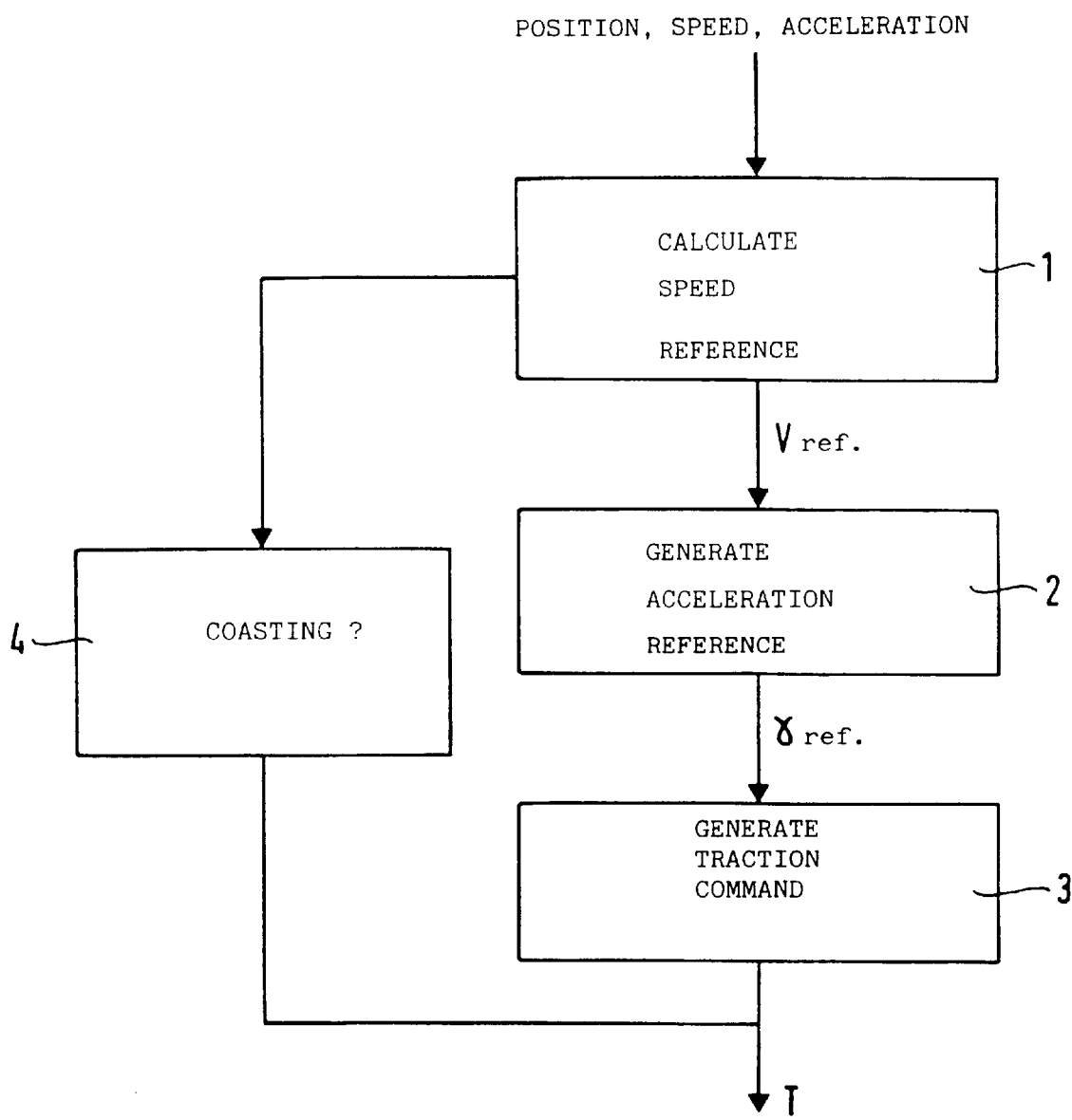
FIG. 1 shows the general architecture of a preferred embodiment of the automatic driver system of the invention.

FIG. 1 shows the general architecture of a preferred embodiment of the automatic driver system of the invention.

FIG. 1 shows three major steps in achieving control of vehicle traction.

A first step 1 consists in calculating a speed reference Vref.

The calculations take account of data such as travel time management, catching up lateness, optimizing energy usage, and servo-control when reducing speed.

A second step 2 corresponds to generating an acceleration reference γref.

This step takes account of limits on acceleration.

A third step 3 corresponds to generating a traction command T.

This step takes account of the robustness to changes in load and to speed measurements.

The architecture of the automatic driver system shown in FIG. 1 also shows a parallel branch 4 for causing the vehicle to coast.

One advantage of the automatic driver system and of the method of generating a speed reference in such a system is that by calculating a speed reference at each sampling instant, it becomes possible to take account of random operating events and to achieve a compromise that minimizes possible lateness and also minimizes energy consumption, e.g. by causing the vehicle to coast.

The position and the speed of the vehicle and orders for slowing it down are information provided to the vehicle as it is travelling.

Conversely, the reference travel time to the next station, the profile of the track, the points to be protected, reference working, and the characteristics of the train are all items of information that are provided either in a station, or else are transmitted by ground equipments, or else are to be found in the memory of the automatic driver system.

In an automatic driver system of the invention, the above three steps and coasting are preferably processed by "fuzzy inference" systems associated with non-fuzzy logic systems.

FIG. 2 is an outline flow chart for a preferred embodiment of the system of the invention for calculating the reference speed Vref.

A situation analysis system S1 directs reference speed calculation either to causing the train to coast or else to calculating the appropriate reference speed Sref.

The train is caused to coast by conventional means M1 that are not described.

A first fuzzy inference system SIF1 estimates how much the vehicle is early or late (i.e. its advance or retard) as a function of the requested travel time, the present time, and three precalculated speed profiles.

The three precalculated speed profiles are either loaded while the vehicle is stopped in a station, or else they are contained in the memory of the automatic driver system.

This first fuzzy inference system SIF1 produces the appropriate reference speed Vref by means of a servo-system S2 during reductions in speed.

The reference speed is calculated so as to avoid becoming too late or too early, so as to attempt to catch up any lateness, and so as to maximize coasting on the journey.

Reductions in speed are calculated so as to avoid collisions between trains.

The principle on which travel time management is based lies in evaluating the present situation of the vehicle relative to three precalculated reference situations.

For a given calculation, the automatic driver system has three tables giving the time required to reach an end point as a function of the position of the vehicle on the track.

These three tables correspond to the three precalculated reference situations.

By way of example, FIG. 3 shows three curves 5 to 7 corresponding to three precalculated reference situations from which the three tables are deduced.

A first table, associated with a first curve 5, corresponds to the minimum travel time, and thus to the maximum possible travel speed.

A second table, associated with second curve 6, corresponds to maximum travel time and thus to minimum travel speed.

A third table, associated with third curve 7, corresponds to average travel time and thus to average travel speed.

The possible speeds take account of the speed limits imposed on the various lengths of track, said limits being represented by a fourth curve 8.

The addition of an intermediate situation has the advantage of taking better account of the particularities of the track.

When the maximum speed profile is not constant, a mean profile consisting in applying a constant factor to the maximum profile does not necessarily constitute an ideal solution.

According to the invention, the situation of the train is described by a variable $\beta$ which is characteristic of the difference between the present situation and limit situations as defined by the first and second curves 5 and 6.

The time remaining Trem is given by the expression:

$$\text{Trem} = \text{Tcons} - \text{Tpresent}$$

and the variable $\beta$ is given by the expression:

$$\beta = (\text{Tmax} - \text{Trem})/(\text{Tmax} - \text{Tmin})$$

where Tmax and Tmin are the remaining travel times corresponding respectively to maximum time working and to minimum time working.

From the above, it can be seen that if $\beta$ is close to 1 or alternatively close to 0, then the reference speed to be followed is respectively close to the maximum admissible speed or to the minimum admissible speed, as the case may be.

If $\beta$ is greater than 1, then the lateness of the vehicle cannot be caught up.

In accordance with the invention, the variable $\beta$ is filtered by a unity gain first order system with a time constant of 1 s, which corresponds to the delay of the traction system.

The first order system is given by the following expression:

$$\beta \text{ effective} = 0.8 \, \beta \text{ previous} + 0.2 \, \beta \text{ current}$$

An advantage of this filtering is to avoid generating excessively sudden variations in the speed reference.

The compromise giving the reference speed to be applied represents the variable $\beta$ shifting progressively between different fuzzy subsets defined between 0 and 1 and corresponding to different reference profiles.

The fuzzy inference systems that are preferably used in the automatic driver system of the invention are of the SUGENO type.

The conclusion of the rules is a linear combination of the input values.

An example of SIF fuzzy inference systems as used in the automatic driver system of the invention is given in Table 1.

TABLE 1

```
/* Definition of variables */
input variable    a    0    5;
input variable    b    0    1;
control variable  c    0    1      sugeno;
/* Definition of fuzzy sets */
a    small triangle    0    0    5;
a    large triangle    0    5    5;
b    small triangle    0    0    1;
b    large triangle    0    1    1;
/* Definition of fuzzy rules */
rule r1 if a is small and b is small    then c is 1 2 3;
rule r2 if a is large and b is small    then c is 1 0 0;
```

The definition of the variables gives the list of input and output variables for the first fuzzy inference system SIF1, together with their respective variation ranges.

The definition of fuzzy sets gives the list of fuzzy sets for each variable, their type, and their characteristic parameters.

Figure 4:
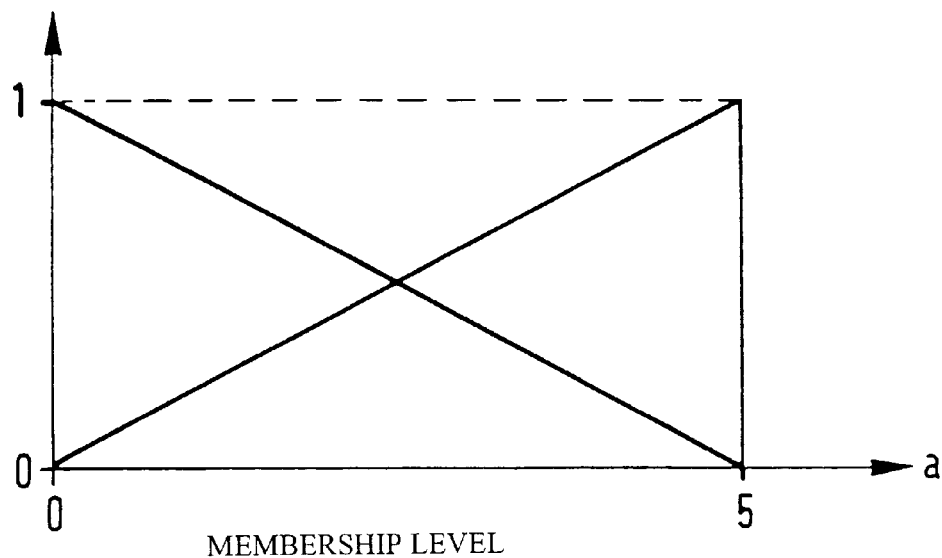
FIG. 4 illustrates a triangle-type fuzzy set as defined by the abscissas of the three vertices of a triangle.

For example, a triangle-type fuzzy set is defined by the abscissa of each of three vertices of a triangle. One such triangle is shown in FIG. 4.

The definition of rules gives the list of applicable fuzzy rules.

Rule r1 should be interpreted as follows:

So long as a and b satisfy the premises of the rule, then c=1+2a+3b.

If the output list is reduced to a single value, then the conclusion of the rule takes that value directly.

By way of example, Table 2 shows the syntax of the first fuzzy inference system SIF1.

TABLE 2

```
/* Definition of variables */
input variable beta    0       1;
input variable vslow   0       5.555;    /* ≈ 20 km/h */
input variable vmean   0       13.5;     /* ≈ 50 km/h */
input variable vfast   0       26.5;     /* ≈ 95 km/h */
control variable v     0       26.5      sugeno;
/* Definition of fuzzy sets */
beta small triangle    0           0           0.846208;
beta medium triangle   0           0.846208    1;
beta large triangle    0.846208    1           1;
```

TABLE 2-continued

```
/* Definition of fuzzy rules */
rule r1 if beta is small    then v is 0 0 1 0 0;
rule r2 if beta is medium   then v is 0 0 0 0 1;
rule r3 if beta is large    then v is 0 0 0 0 1;
```

The first fuzzy inference system SIF1 associated with managing travel time depends on the distance between stations.

The fuzzy sets associated with the variable β possess a variable parameter calculated on the basis of the three above-defined reference travel situations, and are therefore slightly different.

For each length of track between stations, the vertex of the mean fuzzy subset for β is obtained by the following expression:

βmean=(Tmax−Tmean)/(Tmax−Tmin)

The inputs of the first fuzzy inference system SIF1 are the following:

the coefficient β current calculated using the following expression:

Trem=Tcons−Tpresent

β(Tmax−Trem)/(Tmax−Tmin)

the speeds associated with the three reference travel situations.

The output from the first fuzzy inference system SIF1 gives the speed reference and is a combination of the three reference speeds.

It is possible to add intermediate reference travel situations by adding fuzzy sets that are calculated automatically on the basis of the variable β and rules corresponding to the associated speeds.

Figure 5:
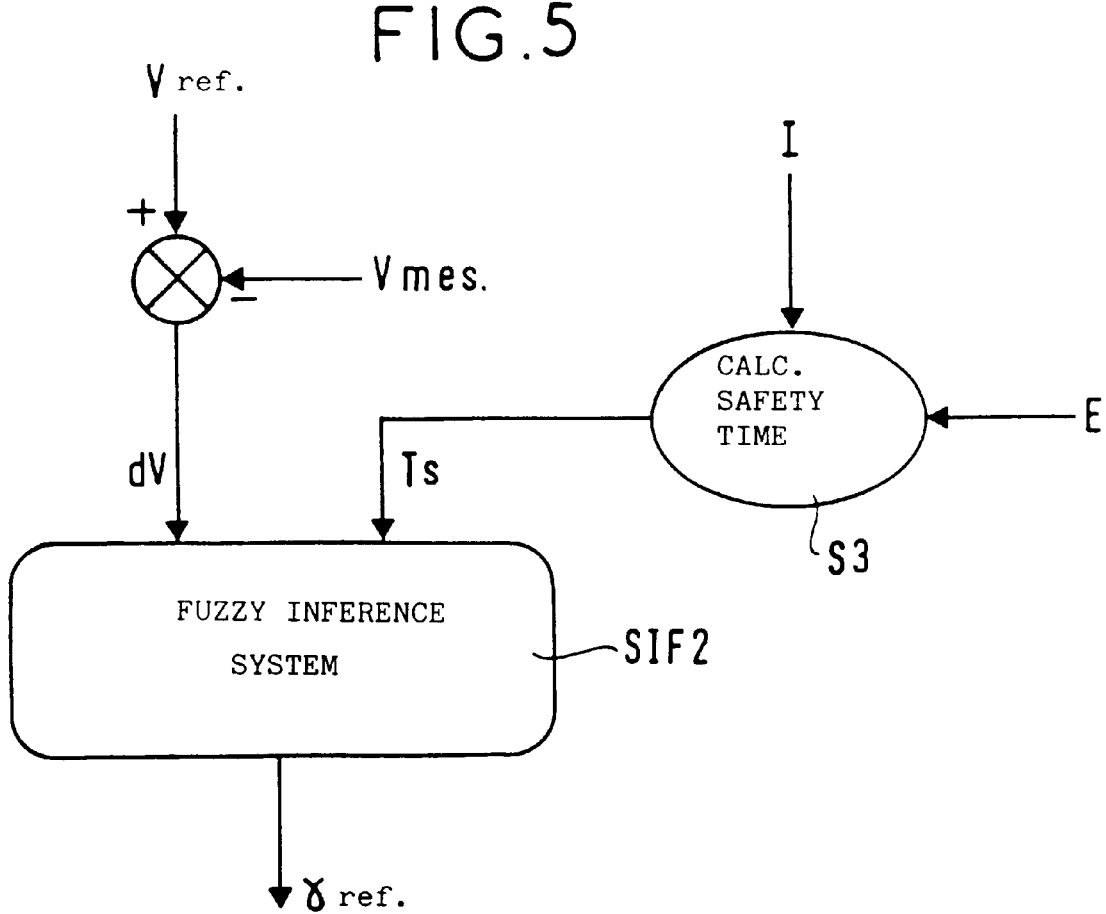
FIG. 5 is an outline flow chart for a preferred implementation of the system of the invention for generating the reference acceleration γref.

FIG. 5 is an outline flow chart for a preferred implementation of the system of the invention for generating the acceleration reference γref.

A second fuzzy inference system SIF2 generates an acceleration reference γref as a function, in particular, of the difference between the speed reference Sref and the measured speed Smes.

The acceleration reference γref is thus generated by a second fuzzy inference system SIF2 which takes as inputs a safety time Ts and the difference between the reference speed Sref and the measured speed Smes.

The safety time Ts corresponds to the time margin between the present instant and triggering emergency braking, given the present status of the train, i.e. its position, its speed, and its acceleration, and given constraints on speed and acceleration.

The safety time is obtained by means of a calculation system S3 which takes account of safety constraints, and in particular, for example: track and train status information I and E, where train status includes position, speed, and acceleration, in particular.

The second fuzzy inference system SIF2 produces the following reasoning:

So long as the safety time is good, i.e. so long as there is no risk of emergency braking being triggered, acceleration depends on the speed difference.

If the safety time is bad, then braking F1 is required.

If the safety time is very bad, then braking F2 is required.

The amount of braking F1 and F2 depend on the characteristics of the train and correspond respectively to mean braking and to maximum braking.

By way of example, Table 3 shows the syntax of the second fuzzy inference system SIF2.

TABLE 3

```
/* Definition of variables */
input variable    dv      −10    10;
input variable    ts      −10    20;
control variable  ts       −1     1    sugeno;
/* Definition of fuzzy sets */
dv NG      triangle    −10   −10   −5;
dv NP      triangle    −10    −6    0;
dv Z       triangle     −6     0    6;
dv PP      triangle      0     6   10;
dv PG      triangle      6    10   10;
ts bad     trapezium   −10   −10    0    1;
ts bad     trapezium     1     2    2    3;
ts good    trapezium     2     3   20   20;
/* fuzzy rules */
rule r1 if ts is good and dv is PG   then acc is  0.7;
rule r2 if ts is good and dv is PP   then acc is  0.3;
rule r3 if ts is good and dv is Z    then acc is   ;
rule r4 if ts is good and dv is NP   then acc is −0.4;
rule r5 if ts is good and dv is NG   then acc is −0.7;
rule r6 if ts is bad                 then acc is −0.7;
rule r7 if ts is bad                 then acc is −1;
```

The inputs of the fuzzy inference system SIF2 are the following:

the difference between the reference speed Sref and the measured speed Smes; and the safety time Ts.

The output from the fuzzy inference system SIF2 is the reference acceleration.

Figure 6:
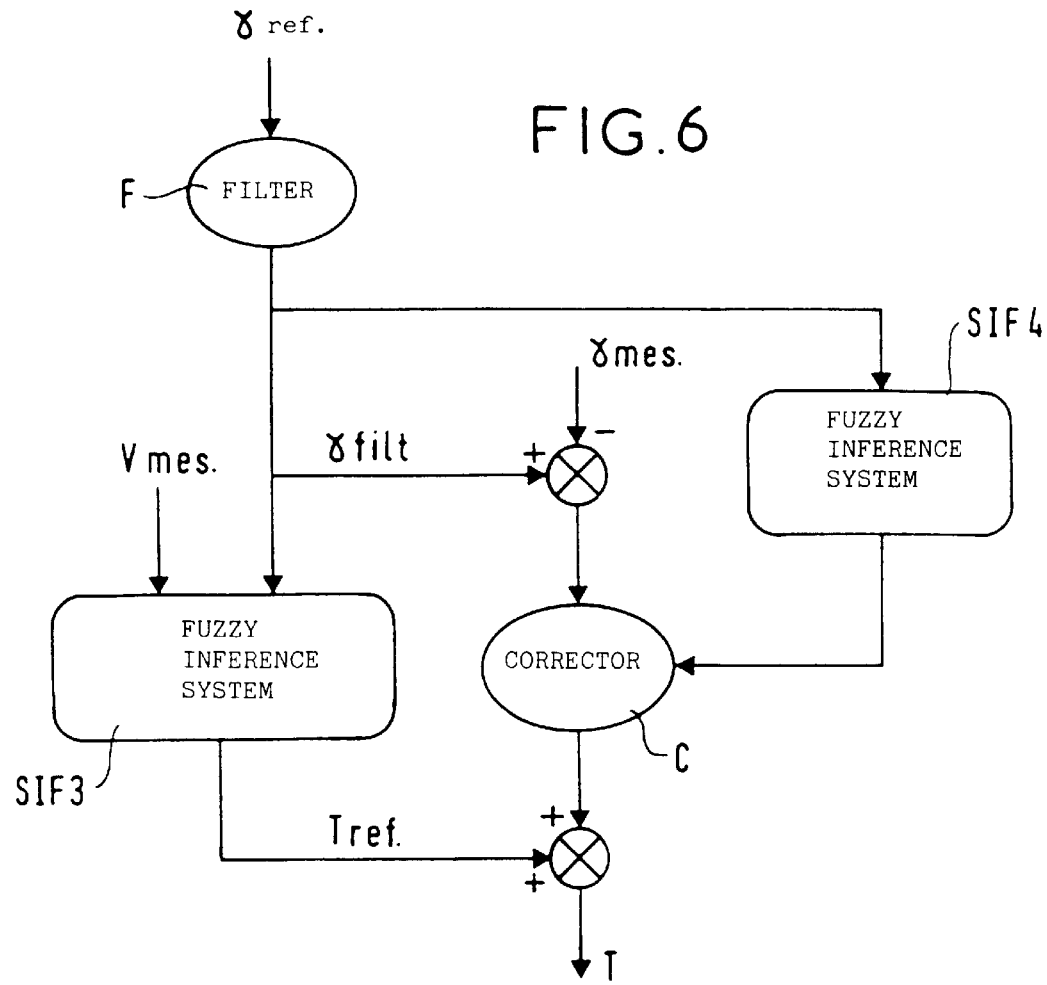
FIG. 6 is an outline flow chart of a preferred embodiment of the system of the invention for generating a traction command T.

FIG. 6 is a block diagram showing how the preferred embodiment of the system of the invention for generating a traction command T operates.

The acceleration reference γref as produced is filtered by a filter F which serves to generate the traction command T by means of a third fuzzy inference system SIF3.

The residual difference between the filtered reference acceleration γfilt and the measured acceleration γmes is corrected by a corrector C of the PIR type (Proportional Integral Retard) or by a Smith predictor whose parameters are driven by a fourth fuzzy inference system SIF4.

The equation describing the PIR corrector is the following:

dtract(k)=A×dtract(k−1)+B×dtract(k−4)+C×E(k)+D×ε(k−1)

where:

dtract(k) is the traction control correction to be applied;

dtract(k−1) is the traction control correction applied at the preceding sampling instant;

dtract(k−R) is the traction control correction that was to be applied R sampling instants ago; and ε is the difference between the reference acceleration and the measured acceleration.

A, B, C, and D are the parameters of the corrector and depend on the dynamics of the system and on the desired performance.

The value of R corresponds to the retard value expressed as a number of sampling instants.

The parameters A and B correspond to the convergence speed of the predictor.

By way of example, A, B, and R have the following values respectively: 0.25, 0.75, and 5.

The coefficients C and D correspond to the gain of the predictor.

Figure 7:
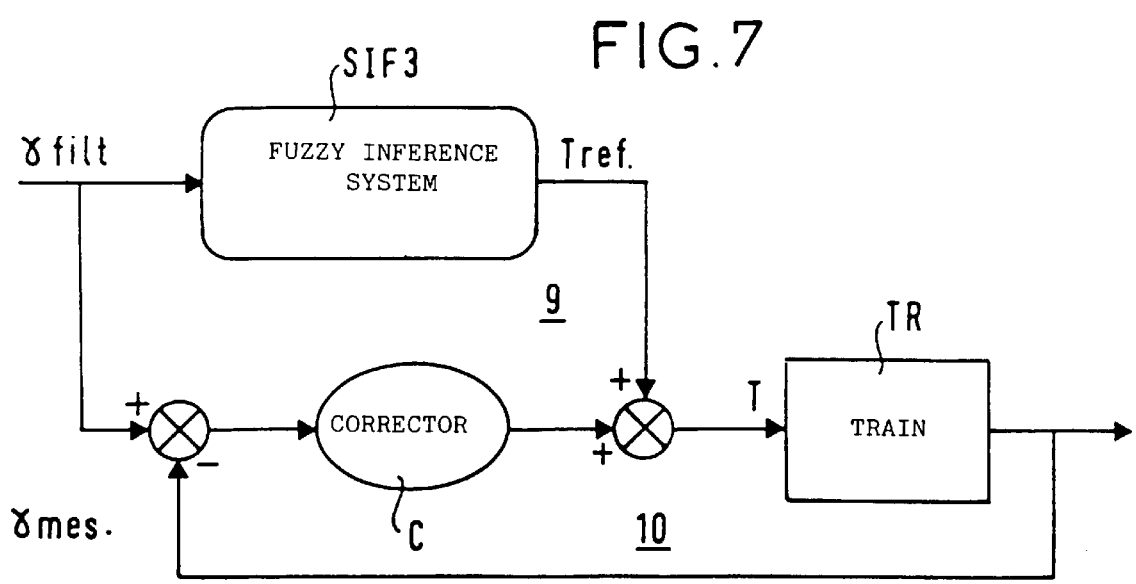
FIG. 7 shows the architecture of the third fuzzy inference system SIF3.

FIG. 7 shows an example of the architecture for the third fuzzy inference system SIF3.

In the architecture used, the third fuzzy inference system SIF3 provides the conventional control loop 9 with a reference traction value Tref.

The reference traction value Tref is corrected by a feedback loop 10, which loop includes the corrector C.

The traction command T is delivered to the train TR.

This embodiment has the advantage of avoiding the drawbacks of a simple feedback loop by indicating directly a control point about which the command to be applied should be found.

From the above there results greater speed and elimination of drag.

The corrector C used in the feedback loop 10 serves to correct errors around a reference value. The feedback loop 10 must take account of the time constants of the system, i.e.: response time, and retard or "lateness". For a response time of 1.5 seconds and a lateness of 1 second, it is preferable to use a PIR type corrector (Proportional Integral Retard) or a "Smith predictor" type corrector so as to synchronize command to the present time with the predicted error.

Such driving has the advantage of ensuring gradual transitions between operating zones that require different adjustments, for example during stages of acceleration or of braking, and likewise of progressively opening the loop during special stages. by way of example, Table 4 shows the syntax of the third fuzzy inference system SIF3.

TABLE 4

| /* Definition of variables */ | | | | | |
|---|---|---|---|---|---|
| input variable | v | 0 | 95; | | |
| input variable | acc | −2 | 2; | | |
| control variable | tract | 0 | 98 | sugeno; | |
| /* Definition of fuzzy sets */ | | | | | |
| v Z | trapezium | 0 | 0 | 0 | 30; |
| v P | trapezium | 0 | 30 | 31 | 55; |
| v M | trapezium | 32 | 58 | 61 | 94; |
| v G | trapezium | 60 | 91 | 95 | 95; |
| acc N | trapezium | −2 | −2 | −0.1 | −0.07; |
| acc PN | triangle | −0.1 | −0.05 | 0; | |
| acc Z | triangle | −0.05 | 0 | 0.3; | |
| acc PM | triangle | 0 | 0.3 | 0.6: | |
| acc PG | triangle | 0.3 | 0.6 | 0.9 | |
| acc PG | trapezium | 0.6 | 0.9 | 2 | 2; |
| /* Definition of rules for tract */ | | | | | |
| rule r0 | if acc is N | then tract is 69.5 0 43.5; | | | |
| rule r1 | if acc is PN and v is Z | then tract is 66; | | | |
| rule r2 | if acc is PN and v is P | then tract is 70; | | | |
| rule r3 | if acc is PN and v is M | then tract is 82; | | | |
| rule r4 | if acc is PN and v is G | then tract is 68; | | | |
| rule r5 | if acc is PN and v is Z | then tract is 68; | | | |
| rule r6 | if acc is PN and v is P | then tract is 76; | | | |
| rule r7 | if acc is PN and v is M | then tract is 84; | | | |
| rule r8 | if acc is PN and v is G | then tract is 91; | | | |
| rule r9 | if acc is PP and v is Z | then tract is 70; | | | |
| rule r10 | if acc is PP and v is P | then tract is 81; | | | |
| rule r11 | if acc is PP and v is M | then tract is 88; | | | |
| rule r12 | if acc is PP and v is G | then tract is 91; | | | |
| rule r13 | if acc is PM and v is Z | then tract is 72; | | | |
| rule r14 | if acc is PM and v is P | then tract is 82; | | | |
| rule r15 | if acc is PM and v is M | then tract is 94; | | | |
| rule r16 | if acc is PM and v is G | then tract is 98; | | | |
| rule r17 | if acc is PG and v is Z | then tract is 85; | | | |
| rule r18 | if acc is PG and v is P | then tract is 93; | | | |
| rule r19 | if acc is PG and v is M | then tract is 98; | | | |
| rule r20 | if acc is PG and v is G | then tract is 98; | | | |

The inputs of the third fuzzy inference system SIF3 are the following:

the measured speed Vmes; and the desired reference acceleration $\gamma$ref.

The output from the third fuzzy inference system SIF3 is the traction command T to be applied.

By way of example, Table 5 gives the syntax of the fourth fuzzy inference system SIF4.

TABLE 5

| /* Definition of variables */ | | | | |
|---|---|---|---|---|
| input variable | acc | 0 | 2; | |
| input variable | dacc | −2 | 0.1; | |
| command variable | C | −20 | 20 | sugeno; |
| command variable | D | −20 | 20 | sugeno; |
| /* Definition of fuzzy sets */ | | | | |
| acc Z | trapezium | 0 | 0 | 0.1 0.4; |
| acc P | trapezium | 0.1 | 0.4 | 2 2; |
| dacc Z | trapezium | 0 | 0 | 0.04 0.08; |
| dacc P | trapezium | 0.04 | 0.08 | 0.1 0.1; |
| /* Definition of rules for tract */ | | | | |
| rule r1 | if acc is Z and dacc is Z | then C is | 10; | |
| rule r2 | if acc is Z and dacc is Z | then D is | −2; | |
| rule r3 | if acc is P and dacc is Z | then C is | 4; | |
| rule r4 | if acc is P and dacc is Z | then D is | −3.2; | |
| rule r5 | if acc is Z and dacc is P | then C is | 0; | |
| rule r6 | if acc is Z and dacc is P | then D is | 0; | |
| rule r7 | if acc is P and dacc is P | then C is | 0; | |
| rule r8 | if acc is P and dacc is P | then D is | 0; | |

More precisely, the inputs of the fourth fuzzy inference system SIF4 are as follows:

the absolute value of the reference acceleration; and the absolute value of the increase in reference acceleration.

The outputs of the fourth fuzzy inference system SIF4 are the parameters C and D of the Smith predictor.

The above results in a method of generating a speed reference in an automatic driver system of the invention.

The method of generating a speed reference in an automatic driver system consists in evaluating the present situation of a vehicle relative to a plurality of precalculated reference situations (5–7) giving the time required to reach a target point as a function of the position of the vehicle on a track in such a manner as to manage the travel time of the vehicle.

Still within the invention, the method of generating a speed reference consists in performing the following:

recording a plurality of precalculated reference situations (5–7) giving the time required to reach a target point as a function of the position of a vehicle on a track; and calculating a speed reference Sref.

The method of the invention for generating a speed reference may include the following additional steps consisting in:

generating an acceleration reference $\gamma$ref;

generating a traction command T; and causing the vehicle to coast.

The method of the invention for generating a speed reference describes the situation of a vehicle by means of a variable $\beta$, said variable $\beta$ characterizing the difference between the present situation and limit situations defined by the following:

a first precalculated reference situation (5) corresponding to the minimum travel time and thus to a maximum speed possible over the journey; and a second precalculated reference situation (6) corresponding to a maximum travel time and thus to a minimum speed over the journey.

What is claimed is:

1. An automatic driver system comprising:

means for recording a plurality of precalculated reference situations giving a time required for a vehicle to reach a target point as a function of the position of the vehicle on a way and of speed limits that apply to the vehicle on various sections of the way; and at least one fuzzy inference system for generating a speed reference Sref for the vehicle at a sampling instant using said reference situations.

2. An automatic driver system according to claim 1, in which:

a first precalculated reference situation corresponds to the minimum travel time and thus to a maximum possible speed over the journey;

a second precalculated reference situation corresponds to the maximum travel time and thus to a minimum speed over the journey;

a third precalculated reference situation corresponds to the mean travel time and thus to a mean speed over the journey; and speed limits imposed on different lengths of the track.

3. An automatic driver system according to claim 1, in which the means for recording include at least one other precalculated reference situation.

4. An automatic driver system according to claim 1, in which:

inputs of a first fuzzy inference system are the following:
a variable $\beta$ which characterizes a difference between a present operating situation of the vehicle and limit situations defined by at least one of said plurality of precalculated reference situations, wherein $\beta$ is calculated using the following expressions:

$$\beta=(Tmax-Trem)/(Tmax-Tmin)$$

where Tmax and Tmin are remaining travel times for a distance corresponding respectively to operation of the vehicle in a maximum travel time and operation of the vehicle in a minimum travel time; and where Trem is given by the expression:

$$Trem=Ttarget-Tpresent$$

where Ttarget is a targeted travel time of the vehicle and Tpresent is a present travel time of the vehicle; and
the speeds associated with the plurality of precalculated references situations; and wherein output of the first fuzzy inference system gives the reference speed Sref and is a combination of said speeds associated with said plurality of precalculated reference situations.

5. An automatic driver system according to claim 4, in which:

inputs of a second fuzzy inference system are the following:

a difference between the reference speed Sref and a measured speed 0 Smes; and a safety time Ts; and wherein output from the second fuzzy inference system is a reference acceleration $\gamma$ref.

6. An automatic driver system according to claim 5, in which:

inputs of a third fuzzy inference system are the following:
measured speed Smes; and
the desired reference acceleration $\gamma$ref; and wherein
output from the third fuzzy inference system SIF3 is a traction command T to be applied to said vehicle.

7. An automatic driver system according to claim 6, in which:

inputs of a fourth fuzzy inference system are the following:

an absolute value of the reference acceleration $\gamma$ref; and an absolute value of the increase in the reference acceleration $\gamma$ref; and wherein outputs of the fourth fuzzy inference system SIF4 are input parameters for controlling a device C by said fourth fuzzy inference system.

8. An automatic driver system for automatic control of a vehicle as claimed in claim 1, further comprising:

means for calculating a speed reference Sref based on a plurality of parameters, said parameters including vehicle travel time management, delay in travel time and energy usage of said vehicle;

means for generating an acceleration reference $\gamma$ref based on acceleration limits of said vehicle and said way on which said vehicle travels;

means for generating a traction command T based on changes in load of said vehicle and speed of said vehicle; and means for causing the vehicle to coast.

9. An automatic driver system for automatic control of a vehicle, comprising:

means for calculating a speed reference Vref based on a plurality of parameters, said parameters including vehicle travel time management, delay in travel time and energy usage of said vehicle;

means for generating an acceleration reference $\gamma$ref based on acceleration limits of said vehicle and a way on which said vehicle travels;

means for generating a traction command T based on changes in load of said vehicle and speed of said vehicle; and means for causing said vehicle to coast.

10. An automatic driver system, comprising:

means for describing an operating situation of a vehicle by means of a variable $\beta$, said variable $\beta$ being determined by a difference between a present operating situation of the vehicle and reference situations including:

a first precalculated reference situation corresponding to a minimum travel time and thus to a maximum possible speed over a distance; and a second precalculated reference situation corresponding to a maximum travel time and thus to a minimum speed over the distance; and means for determining a speed reference for the vehicle based on the variable $\beta$, where the variable $\beta$ is determined by comparing the present operating situation with the first precalculated reference situation and the second precalculated reference situation.

11. A system according to claim 3, in which the variable $\beta$ is given by the following expression:

$$\beta=(Tmax-Trem)/(Tmax-Tmin)$$

where Tmax and Tmin are remaining travel times for said distance corresponding respectively to operation of the vehicle in said maximum travel time and operation of the vehicle in said minimum travel time; and where Trem is given by the expression:

$$Trem=Ttarget-Tpresent$$

where Ttarget is a targeted travel time of the vehicle and Tpresent is a present travel time of the vehicle.

12. A system according to claim 11, in which the reference speed Sref is close to a maximum or to a minimum acceptable speed, when β is respectively close to 1 or to 0.

13. A method of generating a speed reference in an automatic driver system comprising at least one fuzzy inference system comprising the steps of:

recording a plurality of precalculated reference situations giving a time required for a vehicle to reach a target point as a function of a position of the vehicle on a way and of speed limits that apply to the vehicle on various sections of said way; and generating a reference speed for the vehicle at a sampling instant by evaluating a present operating situation of the vehicle relative to said plurality of precalculated reference situations in such a manner as to manage a travel time of said vehicle.

14. A method of generating a speed reference in an automatic driver system according to claim 13, further comprising:

calculating a speed reference Vref based on acceleration limits of said vehicle and the way.

15. A method according to claim 14, including additional steps consisting of:

generating an acceleration reference γref based on said acceleration limits of said vehicle and the way on which said vehicle travels;

generating a traction command T based on chances in load of said vehicle and speed of said vehicle; and causing the vehicle to coast.

16. A method of generating a speed reference in an automatic driver system according to claim 13, comprising:

describing an operating situation of the vehicle by means of a variable β, said variable β characterizing a difference between the present operating situation and limit situations defined by:

a first precalculated reference situation corresponding to a minimum travel time and thus to a maximum possible speed over a distance; and a second precalculated reference situation corresponding to a maximum travel time and thus to a minimum speed over the distance.

17. A method according to claim 16, in which the variable β is given by the following expression:

$$\beta = (Tmax - Trem)/(Tmax - Tmin)$$

where Tmax and Tmin represent remaining travel times for a distance corresponding respectively to operation of the vehicle in said maximum travel time and to operation of the vehicle in said minimum travel time; and where Trem is given by the following expression:

$$Trem = Ttarget - Tpresent$$

where Ttarget is a targeted travel time of the vehicle and Tpresent is a present travel time of the vehicle.

18. A method according to claim 17, in which the reference speed Sref is close to a maximum or a minimum acceptable speed, when β is respectively close to 1 or to 0.

* * * * *